SPINDLE MEANS FOR AN IMPULSE TOOL

Filed Dec. 12, 1962 7 Sheets-Sheet 1

INVENTORS
DONALD K. SKOOG
CHRISTOPHER K. BROWN

BY [signature]
ATTORNEY

Oct. 12, 1965 D. K. SKOOG ETAL 3,210,961

SPINDLE MEANS FOR AN IMPULSE TOOL

Filed Dec. 12, 1962 7 Sheets-Sheet 2

INVENTORS
DONALD K. SKOOG
CHRISTOPHER K. BROWN

BY [signature]
ATTORNEY

SPINDLE MEANS FOR AN IMPULSE TOOL

Filed Dec. 12, 1962

INVENTORS
DONALD K. SKOOG
CHRISTOPHER K. BROWN

BY [signature]
ATTORNEY

INVENTORS
DONALD K. SKOOG
CHRISTOPHER K. BROWN

BY [signature]
ATTORNEY

SPINDLE MEANS FOR AN IMPULSE TOOL

Filed Dec. 12, 1962

7 Sheets-Sheet 5

INVENTORS
DONALD K. SKOOG
CHRISTOPHER K. BROWN

BY [signature]
ATTORNEY

SPINDLE MEANS FOR AN IMPULSE TOOL

Filed Dec. 12, 1962 7 Sheets-Sheet 6

INVENTORS
DONALD K. SKOOG
CHRISTOPHER K. BROWN

BY
ATTORNEY

SPINDLE MEANS FOR AN IMPULSE TOOL

Filed Dec. 12, 1962 7 Sheets-Sheet 7

INVENTORS
DONALD K. SKOOG
CHRISTOPHER K. BROWN

BY [signature]
ATTORNEY

United States Patent Office 3,210,961

Patented Oct. 12, 1965

3,210,961

SPINDLE MEANS FOR AN IMPULSE TOOL

Donald K. Skoog, Mountainside, N.J., and Christopher K. Brown, Sayre, Pa., assignors to Ingersoll-Rand Company, New York, N.Y., a corporation of New Jersey Filed Dec. 12, 1962, Ser. No. 244,151
15 Claims. (Cl. 64—26)

The present invention relates to impulse tools of the type disclosed in U.S. Patent No. 3,116,617 issued January 7, 1964, for Fluid Impulse Torque Tool, and more particularly to an improved impulse tool of this type.

Heretofore, conventional portable, power operated tools for driving nuts, bolts and screws or for applying a torque to other objects have been of the stall, clutch and impact type. While the stall type and clutch type tools give satisfactory torque control in most applications, these types are larger and hence heavier than the impact type tool. Further the stall type and clutch type tools are slower in operation than the impact type tool. In addition the stall type and clutch type tools provide an undesirable torque reaction to the operator, which torque reaction is not present in a tool of the impact type.

In the impact type of tool the kinetic energy of the rotary hammer (of large mass) is transferred to the spindle (of relatively lower mass) by a collision between the jaws of the hammer and the spindle. These conventional impact tools have several limitations. First the rigid jaws of the hammer and the similar jaws of the spindle are relatively light in order to satisfy the demand of the fabricating industries for a light portable tool. However the forces between the jaws of the hammer and the jaws of the spindle are very high during the time of impact therebetween, with resultant breakage or failure of such jaws and a shorter service life than in other conventional power tools, such as those of the stall or clutch types. Secondly, with these conventional impact tools it is very difficult to control or limit the final torque on a threaded fastener to a final predetermined value within satisfactory limits of accuracy. Further the impact tools are difficult to manufacture because of their complicated structure and are rather noisy in their operation.

It is the general object of the present invention to avoid and overcome the foregoing and other difficulties of and objections to prior art practices by the provision of an improved tool of the impulse type which tool has all of the advantages of the stall type, clutch type and impact type tools and none of the disadvantages thereof.

A further object of the present invention is the provision of an impulse type tool which operates in a fluid at low force levels with resultant minimum wear and attendant longer service life than conventional impact tools.

Another object of the present invention is the provision of an impulse tool which is operable to control the final torque on a threaded fastener accurately and precisely within predetermined limits.

Still another object of the present invention is the provision of an impulse tool which, because of the simplicity of its structure, is easy to manufacture.

Yet another object of the present invention is the provision of an impulse tool which provides relatively quiet operation as compared to an impact tool.

A further object of the present invention is the provision of an improved tool of the impulse type, the major elements of which tool act to seal dynamically or at high velocity and function as a valve statically or at low velocity.

A still further object of the present invention is the provision of an impulse tool which is lighter in weight and faster in operation than the tools of the stall type and clutch type.

Another object of the present invention is the provision of a tool operable as a source of impulses, which impulses can be utilized to drive a conventional reciprocating tool, such as a hammer, or a conventional rotary tool, such as a drill.

A further object of the present invention is the provision of an impulse tool which is operable to apply a torque or a series of impulses at an angle with respect to the longitudinal axis of the impulse tool.

A further object of the present invention is to provide a through blade type impulse tool which eliminates the use of springs and provides one or more impulses during each revolution of the driven means.

A still further object of the present invention is to provide an impulse tool in which the springs and bypass slots are eliminated thus providing a stronger spindle and longer life for such spindle.

For a better understanding of the present invention reference should be had to the accompanying drawings, wherein like numerals of reference indicate similar parts throughout the several views and wherein.

Figures 4, 4F:
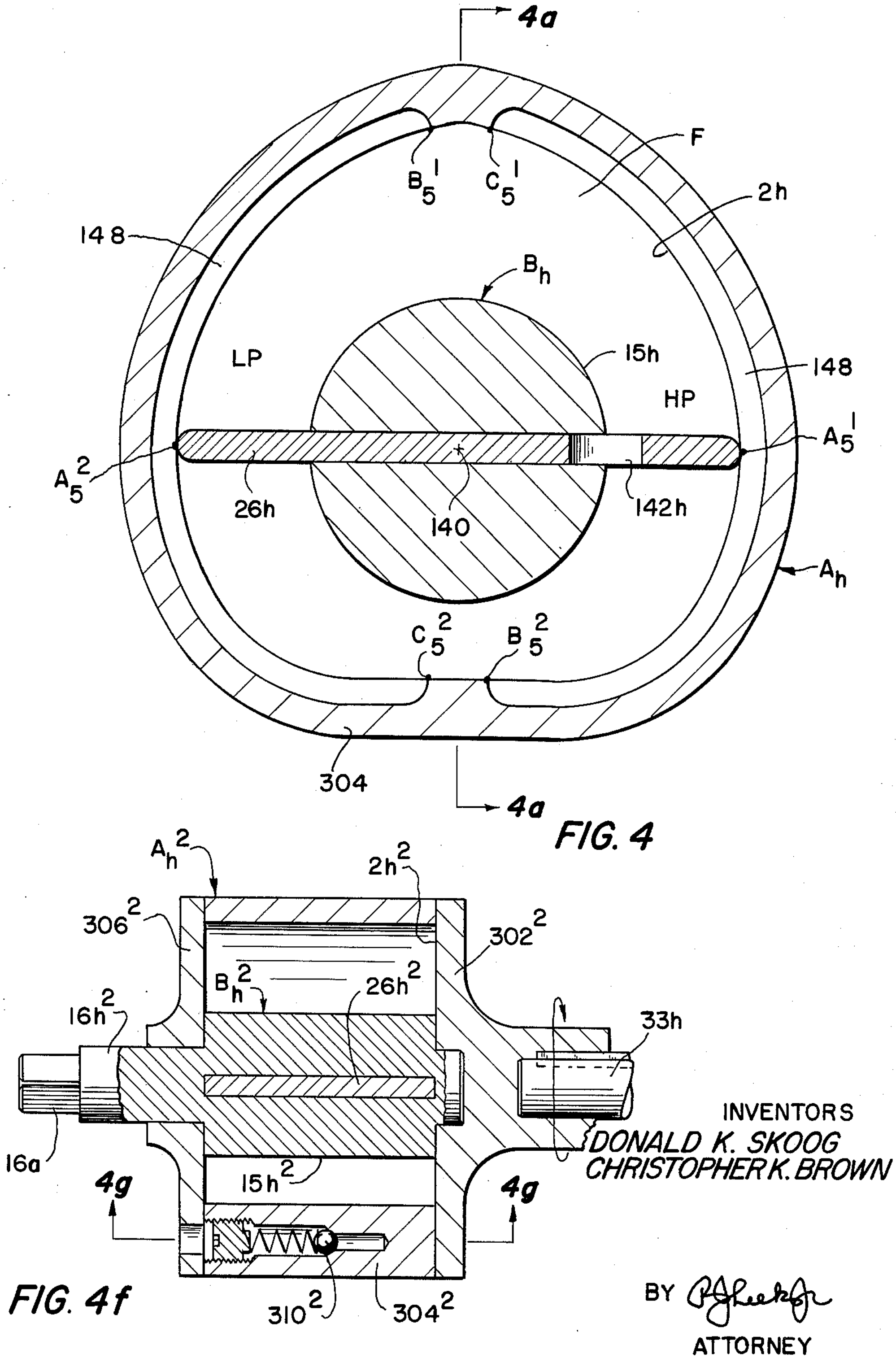
FIG. 4 is a view similar to FIGS. 2 and 3 of a further alternative embodiment of the Impulse Tool.
Figure 4A:
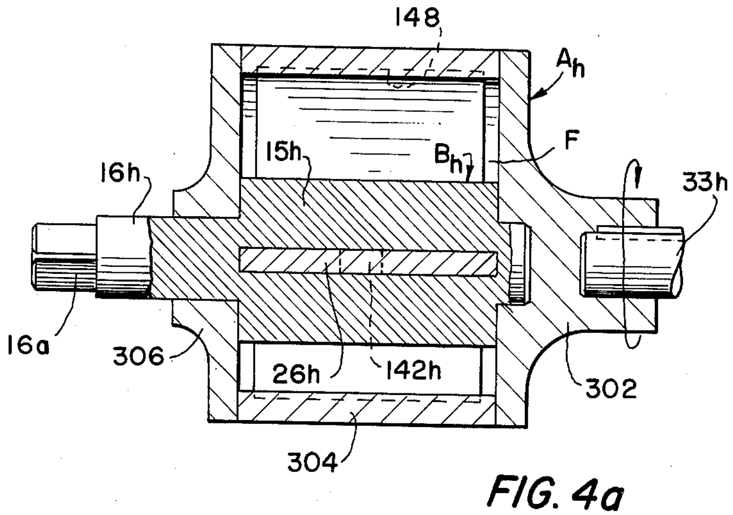
Figure 4B:
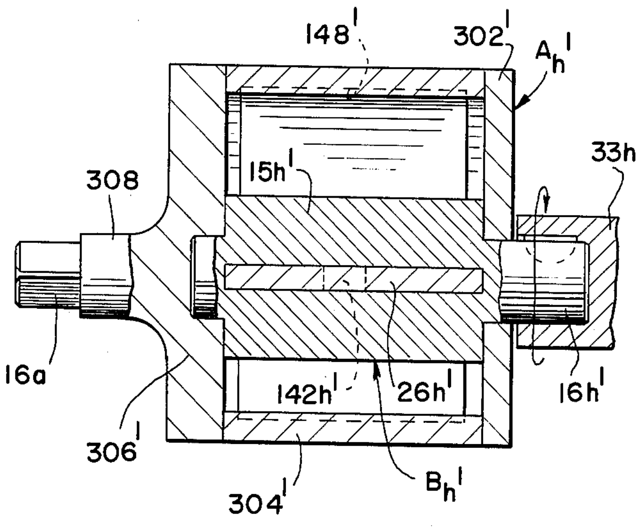
Figure 4G:
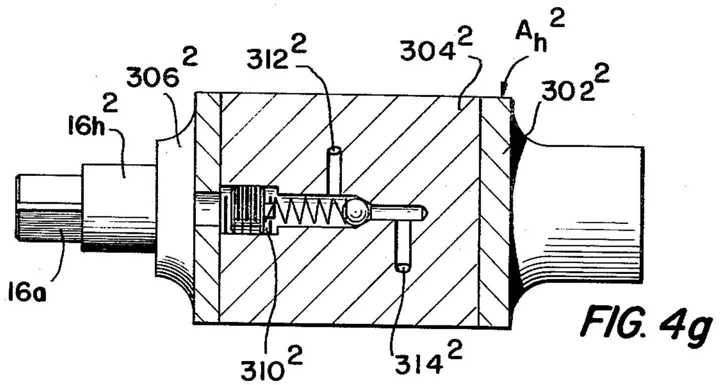
Figure 4H:
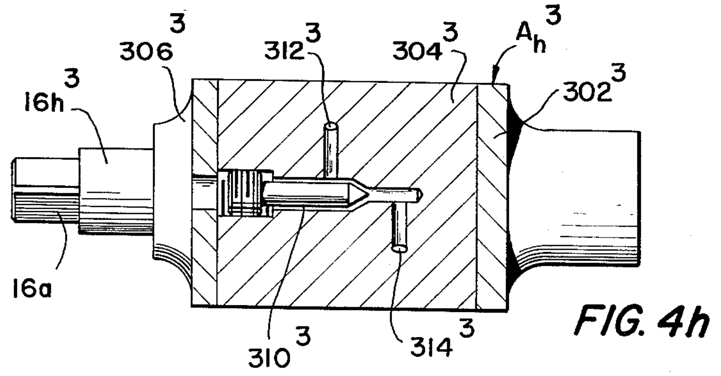
Figure 4C:
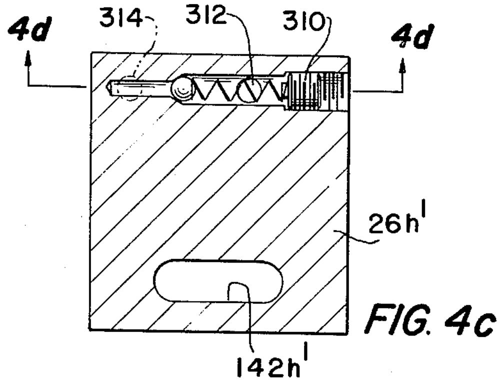
Figure 4E:
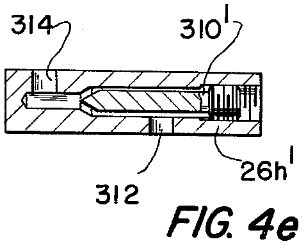
Figure 4D:
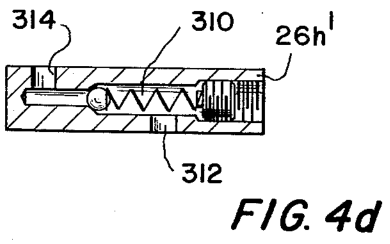
Figures 5, 6A:
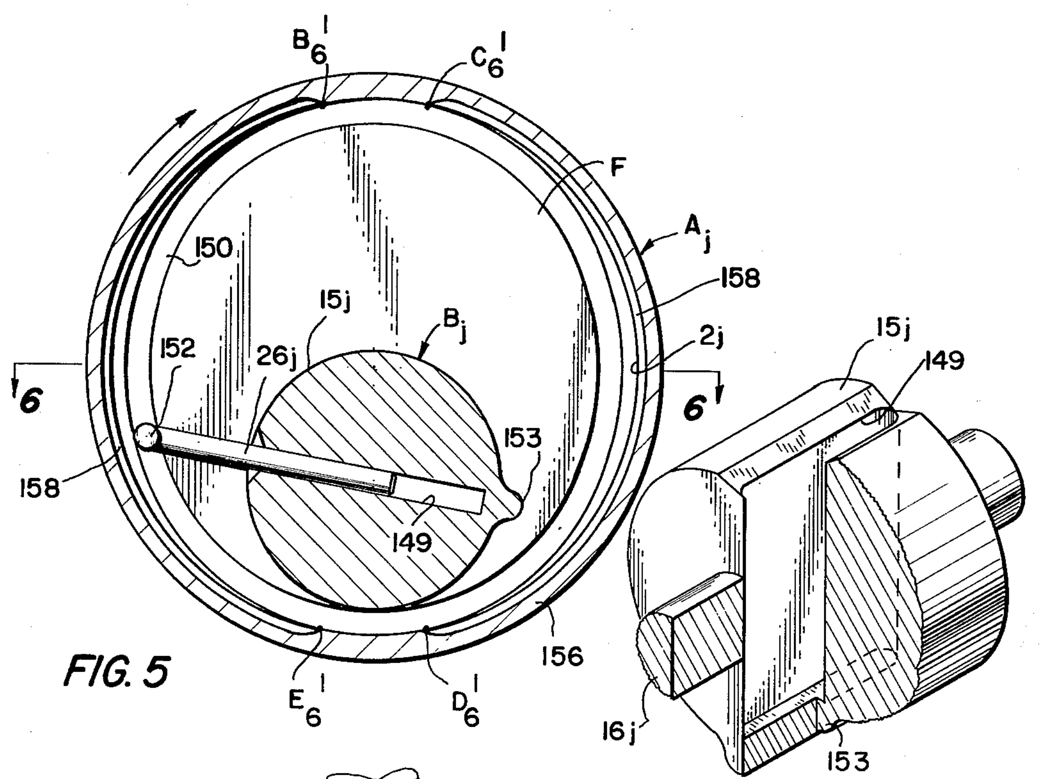
Figure 6:
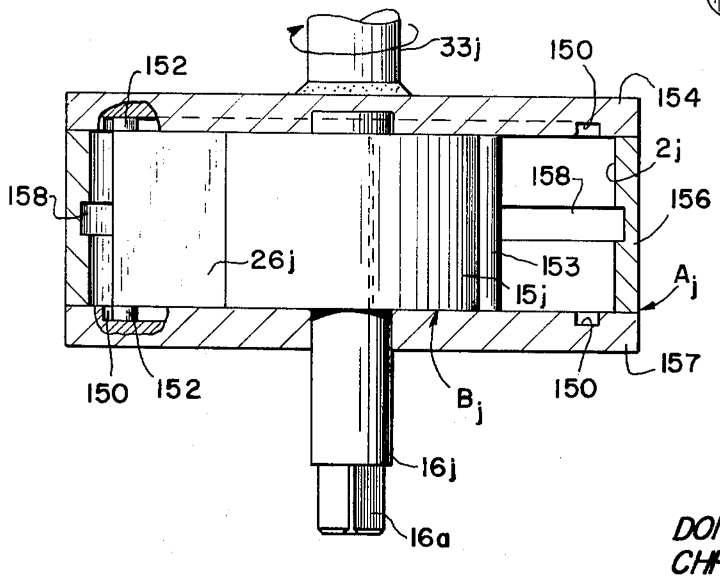
Figure 6B:
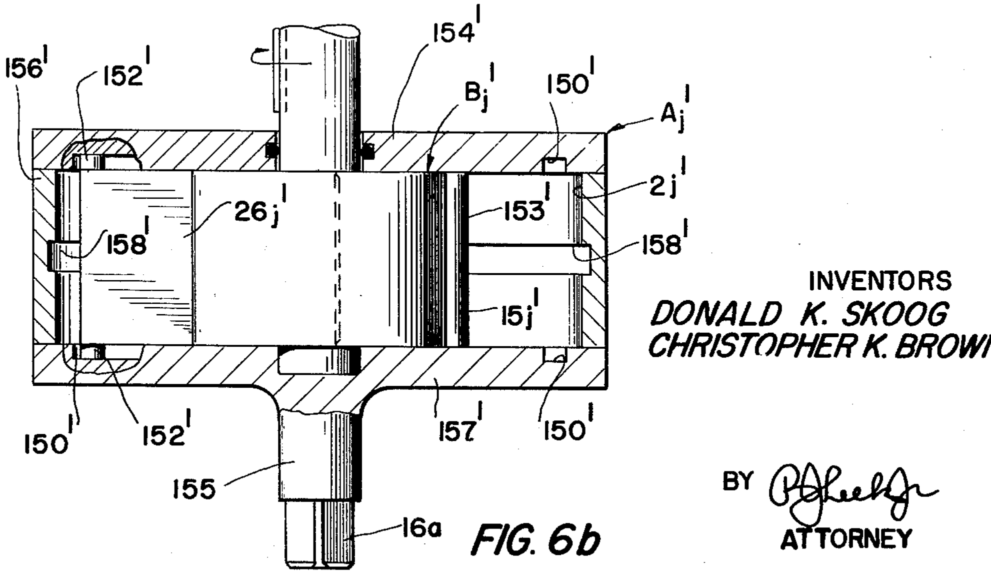

FIG. 4*a* is a vertical sectional view along the line 4*a*—4*a* of FIG. 4 in the direction of the arrows showing the housing means connected to the drive means and the spindle means connected to the square drive for the fastener socket;

FIG. 4*b* is a view similar to FIG. 4*a* showing the spindle means connected to the drive means and the housing means connected to the square drive for the fastener socket;

FIG. 4*c* is a vertical sectional view of a spindle blade similar to the one shown in FIG. 4 and provided with torque control means;

FIG. 4*d* is a vertical sectional view along the line 4*d*—4*d* of FIG. 4*c* in the direction of the arrows;

FIG. 4*e* is a view similar to FIG. 4*d* of an alternative embodiment;

FIG. 4*f* is a view similar to FIG. 4*a* showing the housing means provided with pressure relief means;

FIG. 4*g* is a vertical sectional view along the line 4*g*—4*g* of FIG. 4*f* in the direction of the arrows;

FIG. 4*h* is a view similar to FIG. 4*g* of an alternative embodiment;

FIG. 5 is a horizontal sectional view of the Impulse Tool showing the housing means as the driven member;

FIG. 6 is a vertical sectional view along the line 6—6 of FIG. 5 in the direction of the arrows;

FIG. 6*a* is a perspective of the rotor showing the slot therein for the blade;

FIG. 6*b* is a view similar to FIG. 6 showing the spindle means connected to the drive means and the housing means connected to the square drive for the socket fastener;

The aforesaid objects of the present invention and other objects which will become apparent as the description proceeds are achieved by providing sealing device for an impulse tool for applying a predetermined torque to an object. This impulse tool comprises housing means adapted to contain a fluid, a spindle means rotatable in the housing means and in the fluid and adapted to engage the object, and drive means connected to the housing means for rotating the housing means with respect to the object and the spindle means. The sealing device has a first sealing portion and a second sealing portion on the housing means, through type blade means in the spindle means and gating means in either the housing means or in the blade means. Alternatively, the blade means may engage guide means on the periphery of a cavity in the housing means. The sealing device is operable during a portion of each revolution of the housing means to dynamically seal off a portion of said fluid so that the pressure in the portion of the fluid and on the spindle means increases, thus causing the spindle means to rotate with respect to the housing means and to apply a torque to the object. Alternatively the spindle means is connected to the drive means and the housing means is adapted to engage the object.

The through-blade type impulse tool has through-blade type means carried by the spindle means and is engageable with the housing means. One of the housing means and the through-type blade means is provided with gating means for controlling the application of the predetermined torque.

The impulse tool having a stronger spindle utilizes guide means in the housing means and the spindle blade (which is carried by and is reciprocable in the spindle) rides in the guide means.

While the impulse tool of the present invention may be advantageously employed for applying a torque to objects and as a source of fluid impulses in general, the impulse tool of the present invention is particularly adapted for use in conjunction with applying a torque to a threaded fastener and as a source of fluid impulses for driving a conventional tool and hence it has been so illustrated and will be so described.

Figure 1:
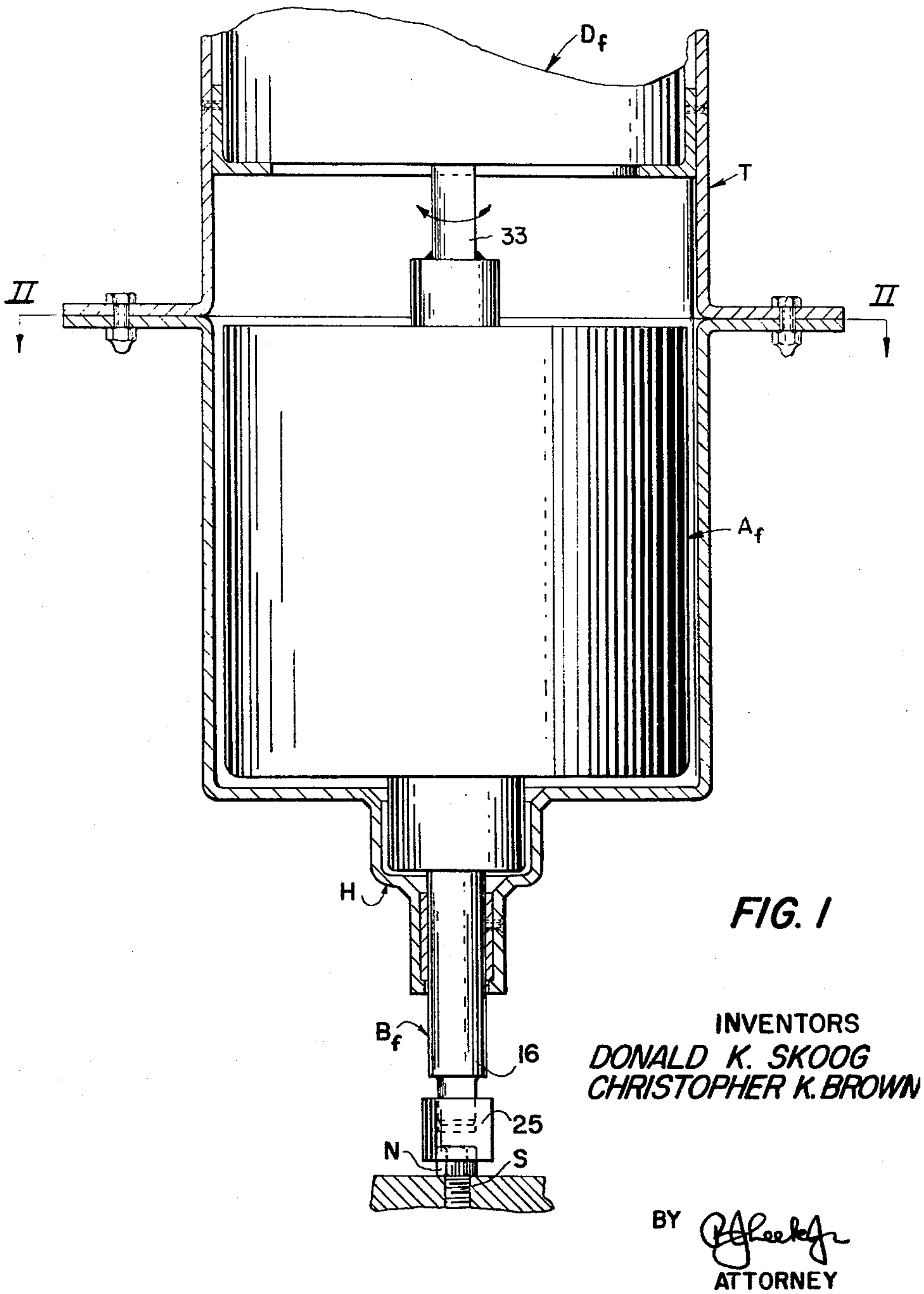
FIG. 1 is a side elevational view of the improved Tool of the impulse type, shown in engagement with a threaded fastener and with a stationary casing means shown in vertical section.

With specific reference to the form of the present invention illustrated in the drawings, and referring particularly to FIG. 1, the impulse tool of the present invention (for applying torque to an object, such as a nut N through a socket 25) is indicated generally by the reference letter T.

As shown in FIG. 1 this impulse tool T has a housing means A*f* provided with a cavity 2*f* adapted to contain a fluid, such as oil F and driven by a drive means, such as the motor D*f*.

Figure 2:
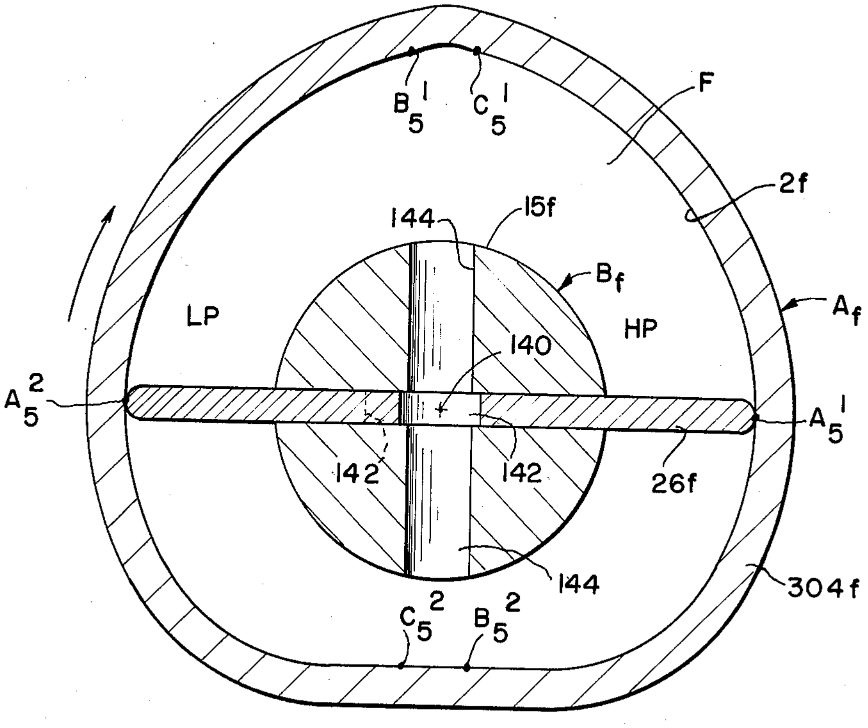
FIG. 2 is a horizontal sectional view of the through blade type Impulse Tool showing the housing means as the driven member.
Figure 3:
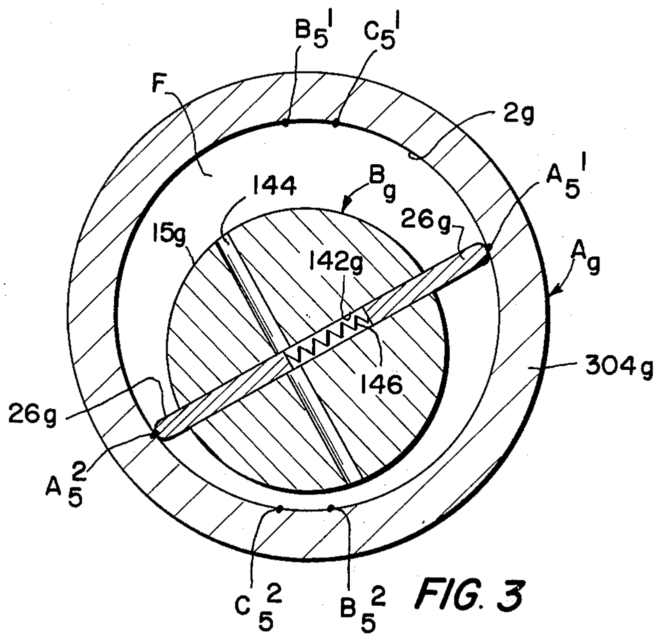
FIG. 3 is a view similar to FIG. 2 of an alternative embodiment of the Impulse Tool.

As shown in FIGS. 2–4 through type blade means 26*f*, 26*g* and 26*h* are carried by the spindle means $B_f$, $B_g$ and $B_h$, respectively. One of the housing means $A_f$, $A_g$, $A_h$ or the through type blade means 26*f*, 26*g*, 26*h* are provided with gating means 142, 142*g*, 142*h*, for controlling the application of the predetermined torque.

As shown in FIG. 2, the center of rotation of the housing means $A_f$ and the spindle 15*f* coincide at 140. The spindle 15*f* has a through type spindle blade 26*f* provided with a gating slot 142. In addition the cavity 2*f* is so contoured that the seal points $A_5^1$ and $A_5^2$ always ride without interference on the side wall of the cavity 2*f*.

It will be understood that the spindle blade 26*f* need only contact the side wall of the cavity 2*f* in sealing engagement at a first sealing portion and a second sealing portion between points $B_5^1$ and $C_5^1$ and $B_5^2$ and $C_5^2$ respectively.

When, for example, the point $A_5^2$ rides between points $B_5^1$ and $C_5^1$ the oil F in the now sealed off high pressure section HP is compressed thereby applying an impulse to the spindle blade 26*f*.

When $A_5^2$ rides between $B_5^2$ and $C_5^2$ the free flow of oil F through the by-pass slot 144 is shut off by the movement of the gating slot 142 out of registry and communication with such by-pass slot 144. There are obviously two such applied impulses for each revolution of the housing means $A_f$.

By increasing the length of the gating slot 142 (i.e., extending the left hand side wall, FIG. 2 to the dotted line position) only one impulse is achieved while $A_5^2$ is between $B_5^1$ and $C_5^1$. None occurs while $A_5^2$ is between $B_5^2$ and $C_5^2$.

Alternatively, (FIG. 3) the housing means $A_g$ has a circular cavity 2*g* and the spindle 15*g* is provided with two spindle blades 26*g* biased radially outward by means of a spring 146 in the gating slot 142*g*, which gating slot 142*g* is formed by the space between the blades 26*g*.

It will be understood that the blades 26*g* reciprocate in the spindle 15*g* as they follow the circular contour of the side wall of the cavity 2*g*.

Referring to FIG. 4 it will be noted that the structural strength of the spindle 15*h* may be increased by eliminating the by-pass slot 144 of FIGS. 2 and 3 and utilizing by-pass slots 148 in the housing means $A_h$.

In order to make the Impulse Tool impulse once during each revolution of the housing means $A_h$, a secondary gating slot 142 (FIG. 4) may be provided. Thus an impulse is delivered when $A_5^2$ is between $B_5^1$ and $C_5^1$ but not when $A_5^2$ is between $B_5^2$ and $C_5^2$.

As shown in FIG. 4*a*, the housing means $A_h$ comprises back end plate 302, cylinder 304 and front end plate 306.

Referring to FIG. 14*b*, it will be understood that the spindle means $B_h^1$ may be connected to the output shaft 33*h*¹ of a drive means, such as an air motor similar to motor D*f* (FIG. 1) as the driven member and that the housing means $A_h^1$ is connected by means of a housing shaft 308 to the square drive 16*a*.

In FIGS. 4*c*, 4*d*, 4*e* torque control means are provided in the spindle blade 26*h*¹. It will be understood by those skilled in the art that spindle blades 26*f* (FIG. 2) and 26*g* (FIG. 3) may also be provided with this torque control means. As shown in FIGS. 4*c*, 4*d*, a low pressure passage 312 in the spindle blade 26*h*¹ connects the low pressure portion LP of the cavity 2*h* (not shown in FIGS. 4*c*, 4*d*) through a pressure relief means, such as an adjustable spring loaded poppet valve 310 to a high pressure passage 314 communicating with the high pressure portion HP of the cavity 2*h*. At maximum desired torque the poppet valve 310 opens, thereby preventing any further increase in the fluid pressure in the high pressure portion HP and any attendant increase in torque.

Alternatively, as shown in FIG. 4*e*, an adjustable needle valve 310¹ may be employed to provide an adjustable leakage path between the high pressure portion HP and low pressure portion LP to control maximum torque on the fastener (not shown).

Alternatively, as shown in FIGS. 4*f*, 4*g*, 4*h*, the pressure relief means may be contained within the housing means $A_h^2$. In FIGS. 4*f*, 4*g*, an adjustable spring loaded poppet valve 310² is employed while in FIG. 4*h* an adjustable needle valve 310³ is utilized.

It will be understood by those skilled in the art that the above described alternative embodiment (FIGS. 2–4, 4*a*–4*j*) may be employed with the following already described embodiments of the Impulse Tool (FIGS. 1–14) of the above-mentioned U.S. Patent No. 3,116,617 namely:

(1) the embodiment (FIGS. 1–13) where the drive means causes relative movement between the housing means and the spindle means, (2) the embodiment (FIGS. 1–12) where the housing means is rotated by the drive means, (3) the embodiment (FIG. 13) where the spindle means is rotated by the drive means.

Referring to FIGS. 5–6, 6*a* it will be understood that in order to provide a stronger spindle blade 26*j*, the housing means $A_j$ is provided with guide means, such as the guide slots 150. The spindle blade 26*j* (which is carried by and reciprocable loosely in a slot 149 in the spindle means (i.e., spindle 15*j*), rides in the guide slots 150.

In this embodiment (FIGS. 5, 6) the spindle blade 26*j* is guided in guide slots 150 in housing means $A_j$ and held therein by means of cylindrical protuberances 152 on such spindle blade 26*j*.

The cavity **2*j* is sealed off when the protuberances 152 are between a land or a first sealing portion defined by seal points $B_6^1$ and $C_6^1$, and a sealing means, such as a sealing lug 153 on the spindle 15*j* engages the housing means $A_j$ between a land or a second sealing portion defined by the seal points $D_6^1$ and $E_6^1$, thus dividing the cavity 2*j*** into a high pressure section HP and a low pressure section LP both not shown in FIG. 5.

One impulse is delivered during each single revolution of the housing means $A_j$, which comprises rear end plate 154 (FIG. 6), cylinder 156 and front end plate 157. The cylinder 156 of the housing means $A_j$ is provided with an oil by-pass space 158 between the first and second sealing portions.

Referring to FIG. 6*b* it will be understood that the spindle means $B_j^1$ is connected to the drive means similar to motor D*f* (FIG. 1) and is rotated thereby. The housing shaft 155 of the housing means $A_j^1$ is connected to the square drive **16*a*** for the socket fastener N (FIGURE 1).

It will be understood by those skilled in the art that the above described alternative embodiment (FIGS. 5, 6, 6*a*–6*d*) may be employed with the following already described embodiments of the Impulse Tool (FIGS. 1–14) of the above-mentioned U.S. Patent No. 3,116,617 namely:

(1) the embodiment (FIGS. 1–13) where the drive means causes relative movement between the housing means and the spindle means, (2) the embodiment (FIGS. 1–12) where the housing means is rotated by the drive means, (3) the embodiment (FIG. 13) where the spindle means is rotated by the drive means.

It will be recognized by those skilled in the art that the objects of the present invention have been achieved by the provision of an impulse tool which applies a force, namely oil pressure, on the spindle blade and spindle for a short time (namely during the dynamic sealing portion of the operating cycle of the impulse tool) thus providing operation in a fluid at low force levels with resultant minimum wear and attendant longer service life than conventional impact tools.

The impulse tool of the present invention is operable to control the final torque on a threaded fastener accurately and precisely within predetermined practical limits. Further, because of the simplicity of its structure, the impulse tool is easy and economical to manufacture. In addition, the impulse tool provides relatively quiet operation as compared with conventional impact tools. The impulse tool acts as a seal dynamically and as a valve statically; has all of the advantages of the stall type, cutch type and impact type tools and none of the disadvantages thereof; is lighter in weight and faster in operation than the tools of the stall type and clutch type. The present invention also contemplates the use of the impulse tool as a source of fluid impulses, which impulses can be utilized to drive a conventional reciprocating tool, such as a hammer, or a conventional rotary tool, such as a drill. The impulse tool is operable to apply a torque or a series of impulses at any desired angle with respect to the longitudinal axis of the impulse tool.

In addition a through-blade type impulse tool has been provided which eliminates the use of springs and provides one or more impulses during each revolution of the driven means.

Again an impulse tool has been also provided which eliminates the use of springs and by-pass slots thus providing a stronger spindle and longer life for such spindle.

While in accordance with the patent statutes one best known embodiment and preferred embodiments of the present invention has been illustrated and described in detail, it is to be particularly understood that the invention is not limited thereto or thereby.

We claim:

1. For an impulse tool for applying a torque to an object, and having housing means provided with a cavity for sealingly containing a fluid, spindle means in said cavity and in said fluid, drive means operatively associated with one of said housing means and said spindle means for causing relative rotary movement between said housing means and said spindle means, and the other of said housing means and said spindle means being adapted to engage said object, a sealing device comprising:

(a) a first sealing portion on said housing means, (b) a second sealing portion on said housing means, (c) through type blade means reciprocable in said spindle means and engageable with said housing means, (d) one of said housing means and said through type blade means being provided with gating means for controlling the application of torque, (e) said first sealing portion and said second sealing portion and said through type blade means being disposed in sealing relation during a relatively small portion of each revolution of said relative rotary movement, (f) said first sealing portion and said second sealing portion and said through type blade means being operable during said relatively small portion of each revolution of said relative rotary movement to dynamically seal off a high pressure portion and a low pressure portion of said fluid in said cavity so that the pressure in said high pressure portion of said cavity and on said other increases thereby causing the other of said housing means and said spindle means to rotate with respect to said one and to apply a torque to said object.

2. The sealing device recited in claim 1 wherein said through type blade means comprises a blade.

3. The sealing device recited in claim 2 wherein said blade is provided with a gating slot communicating with said high pressure portion and said low pressure portion.

4. The sealing device recited in claim 2 wherein said housing means is provided with a bypass slot disposed between said first sealing portion and said second sealing portion.

5. The sealing device recited in claim 1 wherein said through type blade means comprises a pair of spaced blades and biasing means between said blades for maintaining said blades in engagement with said housing means.

6. The sealing device recited in claim 5 wherein said gating means comprises the space between said blades, said space communicating with said high pressure portion and said low pressure portion.

7. The sealing device recited in claim 5 wherein said housing means is provided with a bypass slot disposed between said first sealing portion and said second sealing portion.

8. The sealing device recited in claim 1 wherein said through type spindle means has torque control means communicating with said high pressure portion and said low pressure portion.

9. The sealing device recited in claim 7 wherein said torque control means is a needle valve.

10. The sealing device recited in claim 7 wherein said torque control means is a poppet valve.

11. For an impulse tool for applying a torque to an object, and having housing means provided with a cavity for sealingly containing a fluid, spindle means in said cavity and in said fluid, drive means operatively associated with one of said housing means and said spindle means for causing relative rotary movement between said housing means and said spindle means, and the other of said housing means and said spindle means being adapted to engage said object, a sealing device comprising:

(a) a first sealing portion on said housing means, (b) a second sealing portion on said housing means, (c) guide means on said housing means disposed adjacent the wall of said cavity, (d) a spindle blade reciprocable in said spindle means and connected to said guide means,
(e) sealing means on said spindle means,
(f) said first sealing portion and said second sealing portion, said spindle blade and said sealing means, being disposed in sealing relation during a relatively small portion of each revolution of said relative rotary movement,
(g) said first sealing portion and said second sealing portion, said spindle blade and said sealing means, being operable during said relatively small portion of each revolution of said relative rotary movement to dynamically seal off a high pressure portion and a low pressure portion of said fluid in said cavity so that the pressure in said high pressure portion of the fluid and on said other of said housing means and said spindle means increases, thereby causing said other to rotate with respect to said one and to apply a torque to said object.

12. The sealing device recited in claim 11 wherein said housing means is provided with a bypass slot between said first sealing portion and said second sealing portion.

13. The sealing device recited in claim 11 wherein said first sealing portion is a land.

14. The sealing device recited in claim 11 wherein said second sealing portion is a land.

15. The sealing device recited in claim 11 wherein said sealing means is a sealing protuberance.

References Cited by the Examiner

UNITED STATES PATENTS

| | | | |
|---|---|---|---|
| 887,781 | 5/08 | Fischer | 192—58 |
| 952,433 | 3/10 | Levavasseur | 192—58 |
| 1,099,161 | 6/14 | Brown | 192—58 |
| 1,296,769 | 3/19 | Cooke | 64—26 |
| 1,529,061 | 3/25 | Gordon | 192—58 |
| 1,816,735 | 7/31 | Magness et al. | 192—58 X |
| 2,050,955 | 8/36 | Lee | 192—58 X |
| 2,514,521 | 7/50 | Shaff | 103—137 |
| 2,564,212 | 8/51 | Ramsey | 192—58 |
| 2,565,289 | 8/51 | Zak | 64—28 |
| 2,633,216 | 3/53 | Zak. | |
| 2,676,464 | 4/54 | Warren | 60—54.5 |
| 2,821,840 | 2/58 | Hays | 60—54.5 |
| 2,986,024 | 5/61 | Power | 64—26 |
| 3,116,617 | 1/64 | Skoog | 64—24 |

BROUGHTON G. DURHAM, *Primary Examiner.*

ROBERT C. RIORDON, *Examiner.*